United States Patent [19]

Pesterfield

[11] Patent Number: 5,783,019
[45] Date of Patent: Jul. 21, 1998

[54] METHOD FOR MANUFACTURING SPA COVER CORES

[75] Inventor: John Bryant Pesterfield, Cleveland, Tenn.

[73] Assignee: St. John Manufacturing Co., Inc., Cleveland, Tenn.

[21] Appl. No.: 694,277

[22] Filed: Aug. 8, 1996

[51] Int. Cl.$^6$ .................... B29C 69/00; B29C 69/20
[52] U.S. Cl. .................... 156/285; 156/267; 156/213
[58] Field of Search .................... 156/286, 285, 156/250, 256, 257, 267, 268, 211, 213

[56] References Cited

U.S. PATENT DOCUMENTS

| | | | |
|---|---|---|---|
| 4,758,294 | 7/1988 | Storch | 156/79 |
| 4,857,374 | 8/1989 | Perry | 428/71 |
| 5,231,745 | 8/1993 | Phelan et al. | 264/45.1 |
| 5,397,409 | 3/1995 | Kornylo | 156/79 |

*Primary Examiner*—Francis J. Lorin
*Attorney, Agent, or Firm*—Alan Ruderman

[57] ABSTRACT

A method and apparatus for laminating a polyester film having a heat activated adhesive on one surface onto a porous polystyrene base to form the core of a spa cover or the like. The apparatus includes a table onto which a base is placed and a clamping structure for holding the film, the table communicating with a source of sub-atmospheric pressure. The clamping structure includes a pair of frames, one of which is pivotable relative to the other to open and receive the film therebetween to close upon and clamp the film. A lifting mechanism may lift both frames with the film clamp between the frames. The table is moveable into an oven having heating elements positioned at a location above the table and the clamping frames are lifted to bring the film in close proximity to the heating elements. When the film is heated to the point that the film is readily formable and the adhesive is activated, the frames are brought down so that the film seals with a gasket about the table and also engages the upper surface of the base. The source of sub-atmospheric pressure is then actuated to pull the air in the space between the film and the base through the porous base and through the table and thereby draws the film against the exposed surfaces of the base to laminate the film to such surfaces. After excess film is removed, at least one slit is made in the upper surface of the base and the base is inverted on the table, and the process is repeated.

9 Claims, 5 Drawing Sheets

METHOD FOR MANUFACTURING SPA COVER CORES

BACKGROUND OF THE INVENTION

This invention generally relates to covers for spas, hot tubs or similar pools and other products having a light weight core structure, and more particularly to a method and apparatus for encasing a porous foam base material within a water impermeable covering to form the core.

Spas, hot tubs and similar water tubs or pools have gained substantial popularity in view of the healthful and soothing benefits provided. Covers or lids for such tubs are known so as to close the tub when not being used. This precludes debris from entering the water in the tub, limits the heat loss from the water and protects against the accidental hazards of a child falling into the tub. Such a cover should have sufficient strength and rigidity, be light weight and be relatively inexpensive. In the prior art, many of these covers have been bulky, heavy and expensive and not totally water impermeable. In the known prior art, the core of the cover is constructed from stiff open cell foam plastic material inserted into a polyethylene bag folded around the core and heat sealed closed. This core structure is thereafter covered by a covering constructed from, for example, vinyl. The problem with this construction is that the water can work its way under the vinyl covering and in time will penetrate the polyethylene film. When this occurs, the core becomes water logged, sags and breaks, effectively destroying the function of the cover.

SUMMARY OF THE INVENTION

Consequently, it is a primary object of the present invention to provide a method and apparatus for encasing a plastic foam core base within a water impervious film, the film being laminated about the foam.

It is another object of the present invention to provide a spa cover and the like having a core including an open cell porous plastic foam base encased within a water impervious plastic film, the film being laminated against the surfaces of the base.

It is a further object of the present invention to provide a method and apparatus for laminating a polyester film onto a porous polystyrene base to form the core of a spa cover and the like, the method and apparatus including a table onto which the base is positioned, the table having perforations therein communicating with a source of sub-atmospheric pressure, locating a film coated on one side with heat activated adhesive above the table with the adhesive facing toward the table, moving at least the film into an oven to heat the film until it is formable and to activate the adhesive, bringing the film into engagement with the upper surface of the base and into a sealed engagement with the table about the base, and applying the source of sub-atmospheric pressure to draw the film tightly about the exposed surfaces of the base.

Accordingly, the present invention provides a method wherein an open cell porous foam base of polystyrene is placed on a table through which a vacuum can be drawn and a sheet of formable polyester film coated with a heat activated adhesive is placed above the base and heated until it is softened into a formable condition and the adhesive is activated. The film is then brought into contact with the upper surface of the base and into contact with a seal disposed on the table about the base, and a vacuum or sub-atmospheric pressure is pulled through the table and the base to draw the film tightly against the exposed surfaces of the base to laminate the film onto the base. The excess film is thereafter trimmed away from the base, a slit made in the upper surface of the film, the base inverted on the table, and the process repeated to laminate film over the remainder of the base. The slit is then covered by a small piece of tape to seal the core.

Thus, the invention effectively utilizes the porous base itself as a mold for forming the film into the required shape. In conventional processes where a film is to adhere or form a lamination onto a base material, a mold is formed within which the base is inserted and a vacuum is applied about the base and passageways in the base to draw the film against the base. The present invention requires no separate mold to be created. Thus, a base of various configurations and sizes may be laminated without requiring the expense of manufacturing various molds.

In carrying out the invention, the table has a grid of grooves with apertures communicating with the grooves disposed for enhancing the ability for a vacuum to be drawn through the base and the table also has a gasket or seal about its perimeter. A clamp having upper and lower frame members pivotable relative to one another is positioned adjacent to the table and means is provided to raise the clamp above the table and to lower it onto the table. The table is on a bed which may be readily inserted into and removed from an oven. The upper frame member is pivoted relative to the lower frame member for receipt of the film therebetween and the upper frame member is thereafter closed onto the lower member. The bed including the table is moved into the oven and both frame members are thereafter raised to bring the film closer to the heating elements of the oven. When the film is softened to the point of being readily formed and the adhesive is activated, the frames are lowered onto the table with the film engaging the gasket and the upper surface of the base. The sub-atmospheric pressure or vacuum source is then activated to laminate the film about the exposed surfaces of the base.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENT

Figure 1:
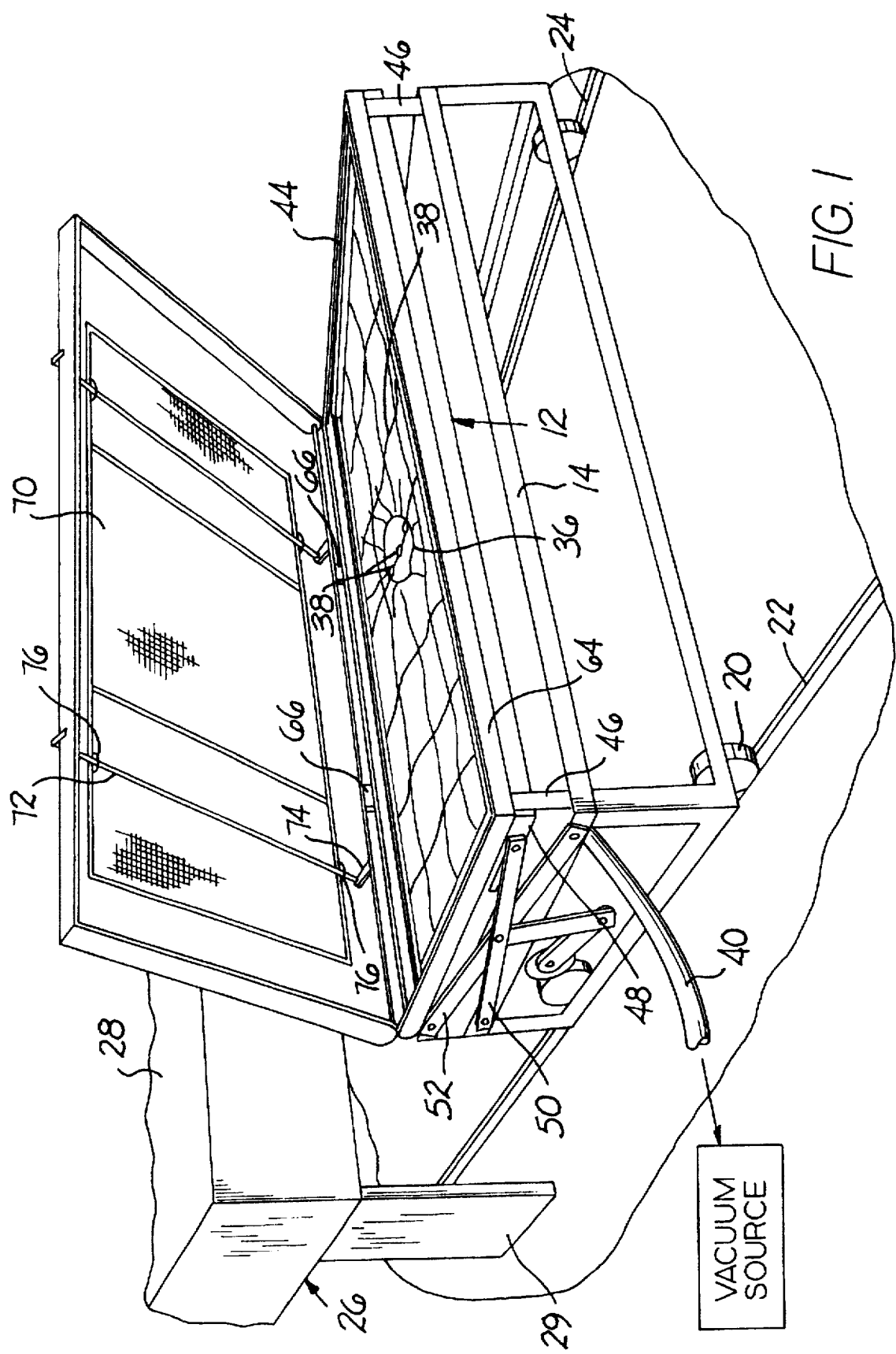
FIG. 1 is a front perspective view of apparatus constructed in accordance with the present invention for carrying out the method of the present invention.
Figure 2:
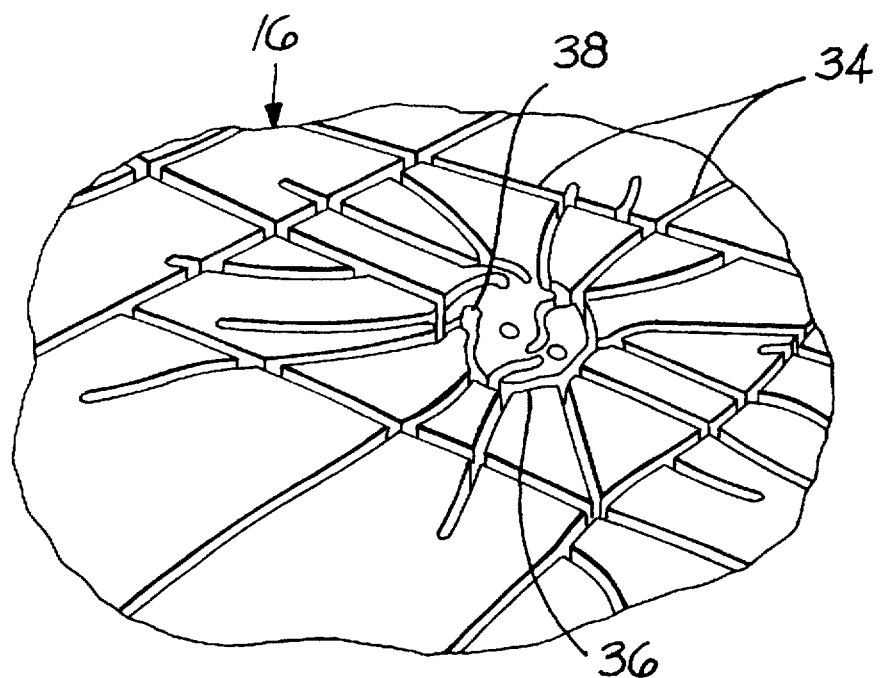
FIG. 2 is a top plan view of a portion of the table illustrated in FIG. 1.
Figure 3:
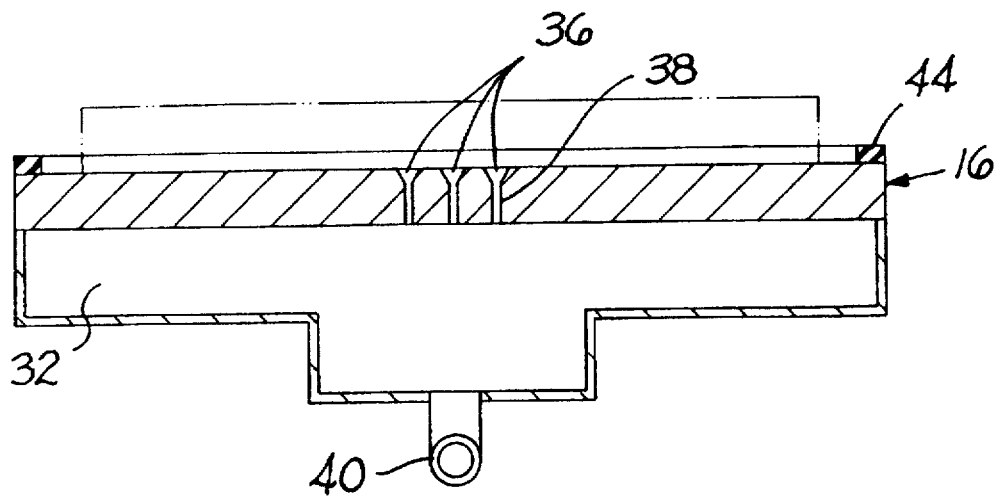
FIG. 3 is a cross sectional view taken through the bed and table of FIG. 1.
Figure 6:
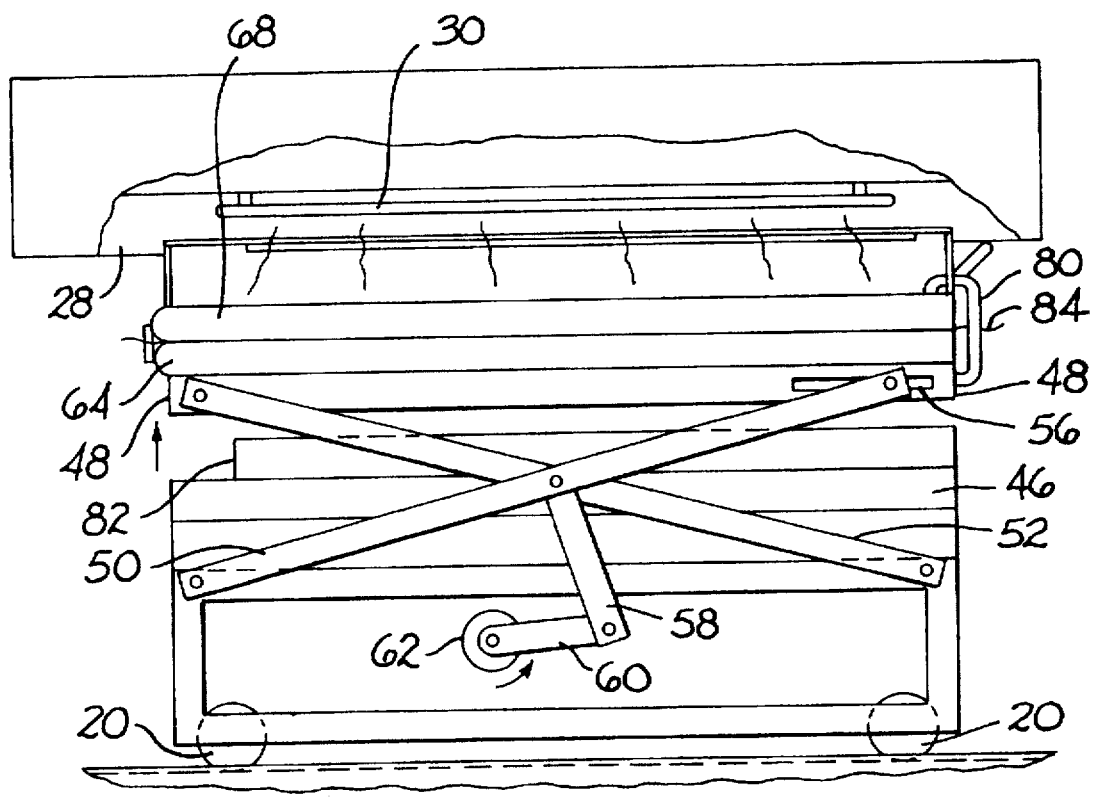
FIG. 6 is a side elevational view of the table within the oven and the clamping mechanism in the raised position above the table, portions of the oven being broken away for clarity.

Referring to the drawings, FIG. 1 illustrates apparatus 10 constructed in accordance with the present invention for performing the method of the present invention. The apparatus 10 comprises a bed 12 having a substantially rectangular base 14 on the upper portion of which a rectangular shaped table 16 is secured. Legs 18 extend downwardly from each corner of the base and are supported by respective wheels 20 rotatably attached to the legs. The wheels at each side of the bed 12 are received within or otherwise ride on a respective track 22, 24 which extends rearwardly into a housing 26 comprising an oven 28 supported above the floor by legs 29 (only one of which is illustrated), the oven having heating elements 30 as illustrated in FIG. 6. As best illustrated in FIG. 3, the base 14 has a hollow body defining a plenum chamber 32 disposed below the table 16 while the table, which may be constructed from particle board or the like, includes an array or grid of intersecting grooves 34. As illustrated in FIG. 2, the grooves 34 may be in the form of wavy or jagged lines rather than linear lines, the lines of grooves extending from a central web 36 of grooves which intersect the grooves 34 of the grid adjacent thereto. In the center of the web 36 there is a series of holes 38 which extend through the table and communicate with the plenum chamber 32. Also communicating with the plenum chamber 32 is a conduit 40 connected to a source of sub-atmospheric pressure 42, commonly known as a vacuum source so that a suction may be pulled in the plenum. Thus, when a vacuum is drawn in the plenum chamber, if the top of the table is sealed from ambient conditions a suction is pulled along the grid of the grooves 34 through the entire length of the table for reasons which will hereinafter will be understood.

Secured to the table 16 about the entire perimeter, i.e., the sides and ends of the table, is a gasket 44 which may be formed from any conventional gasket material, preferably an elastomeric material. Disposed adjacent to a table support member 46 of the bed at each side and outwardly slightly from the sides of the table is a respective lifting bar 48, the lifting bar extending from the front of the bed 12 rearwardly to the rear of the bed. The lifting bar 48 which may be raised relative to the bed 12 and thus the table 16 is normally in its lowermost position as illustrated in FIGS. 1, 4, 5 and 7 and is supported by linkage means comprising first and second elongated linkage arms 50, 52 pivotally connected at one end respectively to opposite ends of the bar 48. The pivot pin 54 of the arm 50 is slidably mounted within a slot 56 formed in the bar 48 or preferably in a block slidably disposed within a substantially C-shape member (not illustrated) welded to the bar 48 for reasons which will be made clear. The other ends of the arms 50, 52 are respectively pivotally connected to the base 14 of the bed 12 at opposite ends of the bed. Additionally, the arms 50, 52 are pivotally connected together and to one end of a lift arm 58 substantially at the mid point of the arms 50, 52. Thus, the arms 50, 52 act in scissors-like fashion and when the arm 58 is raised, the ends of the arms 50, 52 connected to the lifting bar 48 are raised. This raises the lifting bar 48 and the pin or block 54 slides rearwardly within the slot 56. The linkage further includes a link 60 pivotally connected at one end to the lift arm 58 and at its other end rigidly to a rotatable motor driven element 62 selectively rotated to raise the arm 58 and thus the lifting bar 48 to the position illustrated in FIG. 6, and may be rotated back to the position illustrated in FIGS. 1, 4, 5 and 7.

Figure 4:
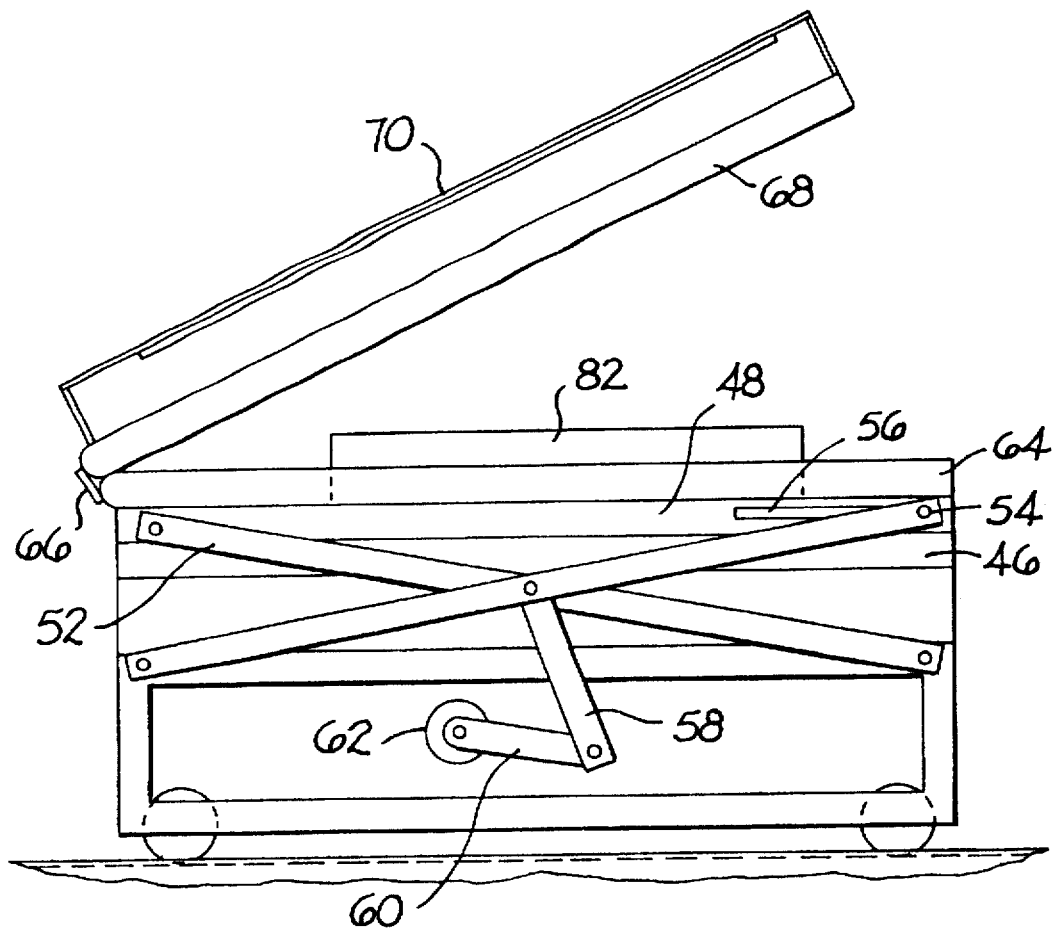
FIG. 4 is a side elevational view illustrating the base of the core to be encased or laminated within a film disposed on the table of the apparatus illustrated in FIG. 1.
Figure 5:
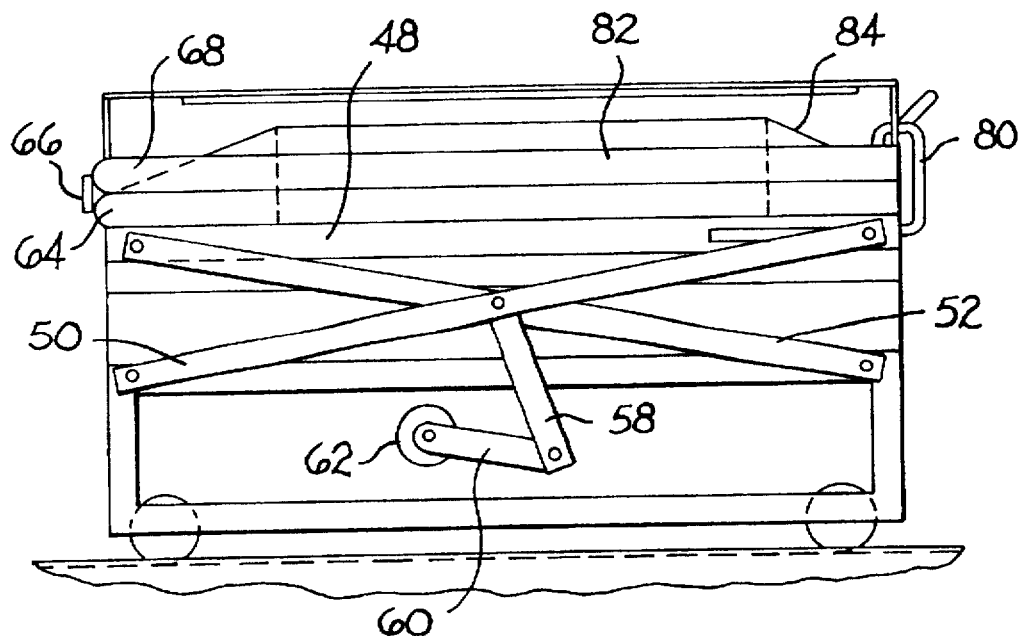
FIG. 5 is a view similar to FIG. 4 with the film positioned in the clamping mechanism.

Positioned on the upper surface of the lifting bar 48 at both sides of the bed 12 are the sides of an open rectangular frame member forming the lower frame 64 of a clam-shell clamp, the front and rear rails of the lower frame 64 being disposed on the support member 46 outwardly of the front and rear of the table, i.e., outwardly of the gasket 44. The lower frame is pivotally connected at the rear by hinge means 66 to an upper frame 68 of substantially the same rectangular configuration and size as the lower frame. It should thus be clear that the frame members 64 and 68 have sides and ends of a size slightly larger than the rectangular dimension of the table 16 so as not to contact the table itself including the gasket material. As aforesaid, the sides of the lower frame rest on the lifting arms and in addition the front and rear ends are supported on the support member 46. The upper frame 68 may be pivoted from a raised position as illustrated in FIGS. 1 and 4 wherein the clamp is open to a lowered position as illustrated in FIGS. 5 and 6 wherein the upper frame is closed onto the lower frame to clamp a sheet of film between the frame members. Fastened to and movable with the upper frame 48 is a screen or grid structure 70 which ensures even distribution of heat to the film while in the oven, as hereinafter made clear, the screen being fastened to the upper frame by any convenient clamping means which may include a rod 72 fastened at one end to a bracket 74 and extending through eyelets 76 secured to the upper frame and attached to another bracket 78 at its upper end. When the upper frame 68 is pivoted to the closed position onto the lower frame 64, it may be secured to the lower frame at the front by clamping members 80 of any convenient form such as the C-clamps illustrated in FIGS. 5, 6 and 7.

In the method of the present invention a porous plastic foam base 82 of the core of a spa cover or any core to be encased or laminated within a plastic film is placed upon the table 16 while the upper frame member 68 is open as illustrated in FIG. 4. The foam base 82, as is conventional with spa cover cores, comprises expanded open cell polystyrene foam which is quite porous. The sheet of film 84 is of a size slightly larger than the rectangular configuration of the frames 64, 68 and, as aforesaid, preferably is polyester film which may have a thickness of approximately 17 mils, is then placed on the lower frame 64 and the upper frame is pivoted downwardly to close onto the film as illustrated in FIG. 5. This may require the lifting bar 48 and thus the lower frame to be raised slightly so that the film may be properly positioned prior to the closure of the upper frame onto the lower frame. The film has a heat activated adhesive which may be a water based adhesive applied on one surface of the film by the film manufacturer, that surface being the surface that faces toward the table 16 and a portion of which contacts or touches the lower frame 64. The frames 64, 68 are then clamped together by the clamping means 80 and the bed 12 is then moved by hydraulic drive means (not illustrated) into the oven 28 as the wheels roll on the tracks 22 so that the frames 64, 68 and film 84 are beneath the heating elements 30 of the oven 28.

Figure 7:
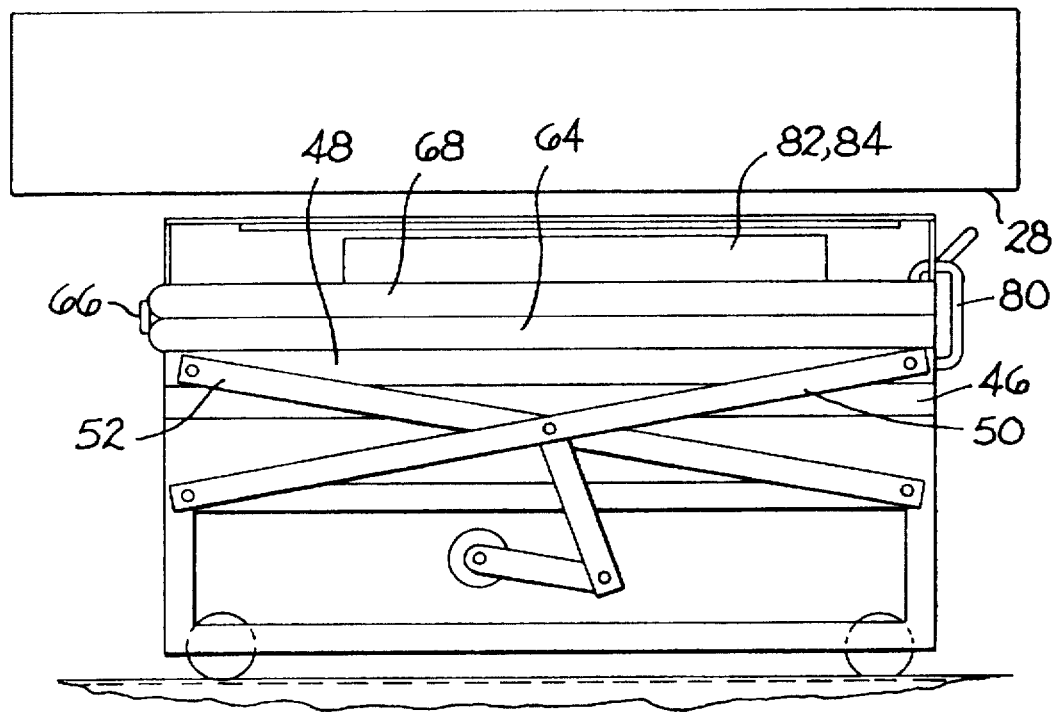
FIG. 7 is a view similar to FIG. 6 but with the clamping mechanism in the lowered position.

The lifting bar 48 is then raised by the linkage 50, 52 as actuated by the motor drive element 62 so that the clamp comprising the frames 64 and 68 are adjacent the heating elements 30 as illustrated in FIG. 6. The film 84 may thus be heated without overheating the base foam 82 and the table 16. When the film is heated to the point that it droops, it is formable and the adhesive is activated. The lifting bar 48 is then moved downwardly to its lower or initial position to engage the film 84 against the top surface of the base 82 and against the peripheral gasket 44 about the table. The vacuum source 42 is then actuated to pull the air within the space between the base 82 and the film 84 through the porous foam of the base out through the holes 38 in the table beneath the base, the air being drawn through the porous foam of the base along the grooves 34 into the web 36 and through the holes 38. The air is thus drawn into the plenum chamber 32 and out an exhaust port of the vacuum source. As illustrated in FIG. 7, when this occurs the film 84 is drawn tightly against the exposed upper and side surfaces of the base 82 and adheres thereto by the action of the adhesive. It should thus be clear that the foam base 82 itself acts as a mold through which air is withdrawn as the film is laminated to the base. The film itself by its sealing engagement with the gasket 44 ensures that all of the air between the film and the table may be drawn out through the porous base. As the air is withdrawn, the film collapses about the exposed surfaces of the base and adheres therethrough.

Figure 8:
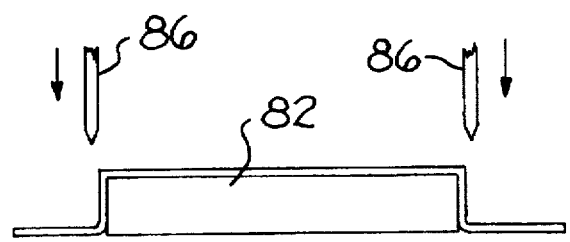
FIGS. 8 through 11 are schematic depictions illustrating the steps in the method of forming the core subsequent to lamination of the film to the top and sides of the base of the core.
Figure 9:
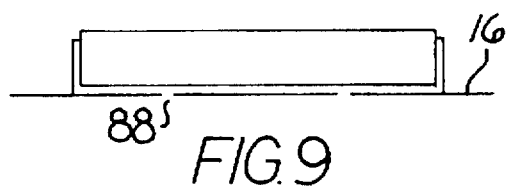
Figure 10:
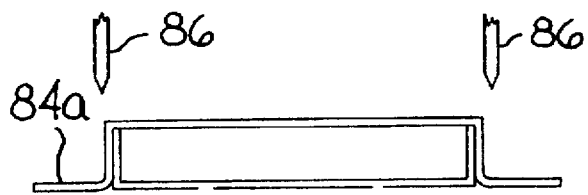
Figure 11:
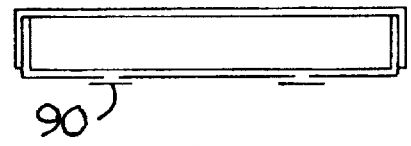

The excess film, i.e., film which extends beyond the periphery of the sides of the base 82, is then severed by cutting means 86, which may be scissors, as illustrated in FIG. 8. One or more slits 88 are then made in the film in the upper surface and the base is inverted on the table as illustrated in FIG. 9. The process is then repeated to adhere another sheet of film 84a to the base so as to laminate the film onto what was previously the bottom of the base, and onto film previously laminated onto the sides of the base. The slits 88 provide the opening through which air may be drawn out of the base when a suction is applied during this stage of the process. After excess film is severed from the second sheet of film 84a, as illustrated in FIG. 10, the slits 88 are sealed by pieces of tape or the like 90.

The process thus laminates a sheet of film onto the porous base in a simple and effective manner. By using the base itself as the mold, the shape of the base may be readily changed without modification of the apparatus. Utilization of a polyester film provides a waterproof encasement of the porous base and permits a spa cover or other product which normally would get wet, to have a long life. A core constructed in accordance with this invention may thereafter be covered by a vinyl covering as in the prior art.

Numerous alterations of the of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A method of laminating synthetic plastic film formable when heated and having a heat activated adhesive on one surface about a porous synthetic plastic foam base, said base having upper, lower and side surfaces, said method comprising placing the lower surface of said base onto a table through which a suction may be drawn to the underside of said table under substantially the entire lower surface of said base, clamping a first sheet of film above said base with said one surface facing toward said base, heating said film until said film is readily formable and said adhesive is activated, lowering said film into contact with the upper surface of said base, sealing peripheral portions of said film to the table at dispositions spaced from said base so that said base is isolated from ambient conditions above said film, and applying a sub-atmospheric pressure to the underside of said table to withdraw air from between said base and said film through said base and said table, thereby to collapse and adhere said film onto the upper and side surfaces of said base, trimming excess film extending from side surfaces of said base from the film adhering to said base, providing at least one slit in the film on said upper surface of said base, inverting said base, so that said upper surface and lower surface are inverted, placing the inverted upper surface of said base onto said table so that the inverted lower surface faces away from said table, and laminating a second sheet of such film onto the inverted lower surface of said base to encase said base within film by clamping said second sheet above the base, heating said second sheet, lowering said second sheet onto the inverted lower surface, and applying sub-atmospheric pressure to the underside of said table to withdraw air through said slit.

2. The method as recited in claim 1, wherein said table includes a peripheral seal thereon, and said sealing of peripheral portions of said film to said table comprises abutting said film tightly against said seal.

3. The method as recited in claim 2, wherein said clamping comprises disposing said sheet of film between an upper and a lower clamping frame member, and securing said frame members together with said film therebetween.

4. The method as recited in claim 3, wherein said heating of said film comprises raising said clamp frame members above said table into proximity with heating elements.

5. The method as recited in claim 1, wherein said porous foam base comprises expanded polystyrene material.

6. The method as recited in claim 5, wherein said sheet of film comprises polyester material.

7. The method as recited in claim 6, wherein said clamping comprises disposing said sheet of film between an upper and a lower clamping frame member, and securing said frame members together with said film therebetween.

8. The method as recited in claim 7, wherein said heating of said film comprises raising said clamp frame members above said table into proximity with heating elements.

9. The method as recited in claim 8, wherein said table includes a peripheral seal thereon, and said sealing of peripheral portions of said film to said table comprises abutting said film tightly against said seal.

* * * * *